US012784525B2

(12) United States Patent
Kimura et al.

(10) Patent No.: US 12,784,525 B2
(45) Date of Patent: Nov. 3, 2026

(54) PROCESSING OF MEDIA

(71) Applicant: Glory Ltd., Himeji (JP)

(72) Inventors: Yasushi Kimura, Himeji (JP); Shoutaro Fujii, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 19/073,084

(22) Filed: Mar. 7, 2025

(65) Prior Publication Data

US 2026/0268722 A1 Sep. 10, 2026

(51) Int. Cl.

| | |
|---|---|
| ***G07D 11/12*** | (2019.01) |
| ***G06T 7/00*** | (2017.01) |
| ***G07D 11/125*** | (2019.01) |
| ***G07D 11/235*** | (2019.01) |
| ***G07D 11/50*** | (2019.01) |

(52) U.S. Cl.

CPC .......... *G07D 11/125* (2019.01); *G06T 7/0002* (2013.01); *G07D 11/235* (2019.01); *G07D 11/50* (2019.01)

(58) Field of Classification Search

None

See application file for complete search history.

(56) References Cited

U.S. PATENT DOCUMENTS

| | | | | |
|---|---|---|---|---|
| 3,949,364 | A * | 4/1976 | Clark | G07D 11/135 235/375 |
| 8,958,906 | B2 * | 2/2015 | DePietro | G07F 19/205 700/214 |
| 11,900,753 | B1 * | 2/2024 | Mande | G07F 19/205 |
| 2007/0229253 | A1 * | 10/2007 | Langlotz | G07D 11/245 340/540 |
| 2020/0065787 | A1 * | 2/2020 | Kruczek | G06Q 20/40145 |
| 2022/0301399 | A1 | 9/2022 | Namura et al. | |

FOREIGN PATENT DOCUMENTS

| | | |
|---|---|---|
| JP | 2002-042206 A | 2/2002 |
| JP | 2022-145052 A | 10/2022 |

* cited by examiner

*Primary Examiner* — Thien M Le
*Assistant Examiner* — April A Taylor
(74) *Attorney, Agent, or Firm* — XSENSUS LLP

(57) ABSTRACT

A system for processing media includes: a first media processing device without a safe and configured to count media; a second media processing device having a safe including an internal storage, the second media processing device being configured to take in media from an external storage attached outside the safe and store the media in the internal storage; and a computer coupled to the first media processing device and the second media processing device. The computer is configured to, in response to a total number of media counted by the first media processing device exceeding an upper limit value of the external storage, output warning information to prompt an operator to attach the external storage to the second media processing device.

18 Claims, 9 Drawing Sheets

PROCESSING OF MEDIA

BACKGROUND

The present disclosure relates to processing of media.

A media processing device may take in media from an external storage and store them in an internal storage of the media processing device.

SUMMARY

According to an embodiment of the present disclosure, there is provided a system for processing media. The system includes: a first media processing device without a safe and configured to count media; a second media processing device having a safe including an internal storage, the second media processing device being configured to take in media from an external storage attached outside the safe and store the media in the internal storage; and a computer coupled to the first media processing device and the second media processing device. The computer is configured to, in response to a total number of media counted by the first media processing device exceeding an upper limit value of the external storage, output warning information to prompt an operator to attach the external storage to the second media processing device.

According to another embodiment of the present disclosure, there is provided a system for processing media. The system includes: an external storage in which media are stored at a drive-through counter; and a media processing device installed at a teller counter or in a bank lobby distant from the drive-through counter and having a safe including an internal storage, the media processing device being configured to, in response to the external storage being attached outside the safe, take in media from the external storage and store the media in the internal storage.

DETAILED DESCRIPTION

Hereinafter, exemplary embodiments of the present disclosure will be described in detail with reference to the attached drawings.

It is to be noted that the present disclosure is not limited to these exemplary embodiments to be given below and may be implemented with various modifications within the scope of the present disclosure. In addition, the drawings used herein are for purposes of illustration, and may not show actual dimensions.

The present disclosure is directed to processing of media. Hereinafter, banknotes will be used as an example of media. The term "banknote" as used herein denotes paper currency issued by a government or a bank. Paper currency may also be referred to as a "bank bill" or simply a "bill," but will be referred to as a "banknote" in the following. Media may also be checks or coins. Thus, the present disclosure is applicable, for example, to cases where a mixture of banknotes and checks is processed, or where a mixture of banknotes and coins is processed.

First Exemplary Embodiment

Figure 1:
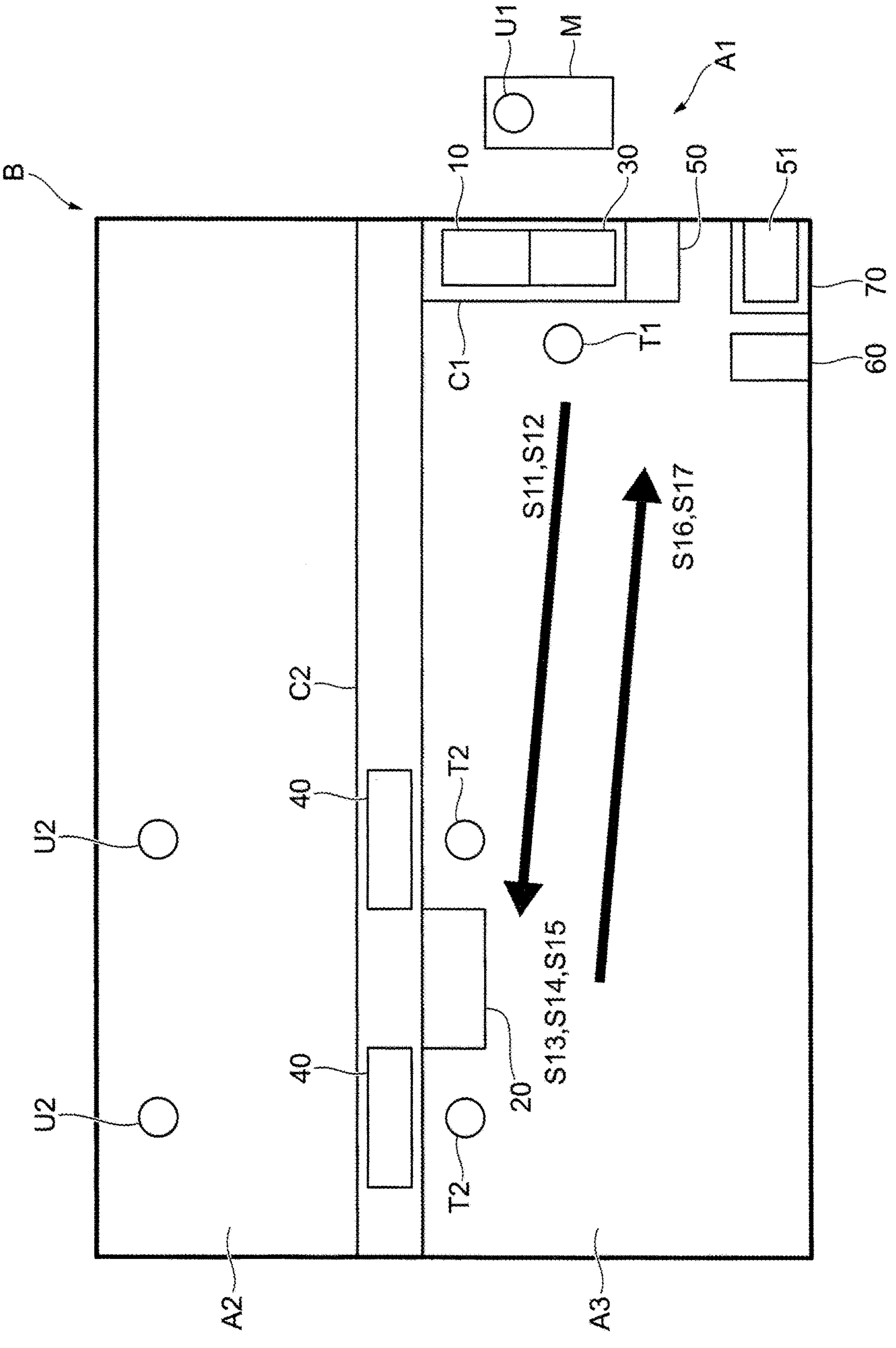
FIG. 1 shows an example of the layout of a bank according to a first exemplary embodiment.

FIG. 1 shows an example layout of a bank B according to a first exemplary embodiment. As shown in FIG. 1, the bank B may face a drive-through A1 and may include a bank lobby A2 and a backyard A3.

A drive-through counter C1 may be placed facing the drive-through A1. At the drive-through counter C1, a teller T1 may provide banking services to a customer U1 who is still in a car M. The drive-through counter C1 may be equipped with a banknote counting device 10 and a drive-through terminal 30. The banknote counting device 10 may be a device that does not have a safe and is dedicated to counting banknotes. The banknote counting device 10 is an example of the claimed first media processing device. The drive-through terminal 30 may be a terminal device that is connected to the banknote counting device 10 and controls the banknote counting device 10. The drive-through terminal 30 may be a computer. The drive-through counter C1 may also initially include an external cassette 50. The external cassette 50 is an example of the claimed external storage. Although only one drive-through counter is shown here, there may be multiple drive-through counters.

A teller counter C2 may be located separating the bank lobby A2 from the backyard A3. The teller counter C2 may be distant from the drive-through counter C1. At the teller counter C2, a teller T2 may provide banking services to a customer U2 who walks in. The teller counter C2 may be equipped with a banknote processing device 20 and a teller terminal 40. The banknote processing device 20 may be a device that has a safe and takes banknotes from outside the safe and stores them inside the safe. The banknote processing device 20 is an example of the claimed second media processing device. In the first exemplary embodiment, the banknote processing device 20 may be a teller cash recycler (TCR). The TCR is an example of the claimed device used by a teller to process media. The teller terminal 40 may be a terminal device that is connected to the banknote processing device 30 and controls the banknote processing device 30. The teller terminal 40 may be a computer.

A camera 60 and a rack 70 may additionally be provided near the drive-through counter C1. The camera 60 may be connected to the drive-through terminal 30 and may capture images around the drive-through counter C1. The rack 70 may be connected to the drive-through terminal 30 and may store a spare external cassette 51 in a locked state. The spare external cassette 51 is an example of the claimed spare external storage.

In the following, the drive-through terminal 30 and the teller terminal 40 are configured as separate devices, but this is not limiting. The drive-through terminal 30 and the teller terminal 40 may be configured as a single device, except for respective displays corresponding to the banknote counting device 10 and the banknote processing device 20. In cases where the drive-through terminal 30 and the teller terminal 40 are configured as a single device, the single device is an example of the claimed computer.

In the first embodiment, the tellers T1 and T2 may generally perform the following actions.

First, the teller T1 may receive banknotes for deposit from the customer U1 at the drive-through counter C1 (step 11). At that time, the teller T1 may acquire the account information about the customer U1 using the card reader and the like of the banknote counting device 10. The teller T1 may also count the banknotes received from the customer U1 with the banknote counting device 10. The drive-through terminal 30 may then obtain the account information and counting results from the banknote counting device 10. The counting results may include the denominations and the symbolic code numbers of the banknotes. Further, the drive-through terminal 30 may calculate the cumulative number of banknotes counted by the banknote counting device 10. As a result, assume that the drive-through terminal 30 has determined that the cumulative number of banknotes has exceeded the upper limit of banknotes that can be stored in the external cassette 50. That is, assume that the drive-through terminal 30 has determined that the received banknotes cannot be stored in the external cassette 50 in use. In that case, the drive-through terminal 30 may output warning information to that effect. Here, the warning information may be information that prompts the teller T1 to attach the external cassette 50 to the banknote processing device 20.

Next, the teller T1 may store the received banknotes in the external cassette 50, if the banknotes can be stored in the external cassette 50 in use (step 12). Here, the internal chip of the external cassette 50 may hold the unique number of the external cassette 50. The unique number of the external cassette 50 may be, for example, the terminal number of the drive-through terminal 30. The unique number may be used to identify the appropriate external cassette 50 from among multiple external cassettes that may be attached to the banknote processing device 20.

The above steps 11 and 12 may be repeated until the warning information is output in step 11.

The teller T1 may then move to the teller counter C2. Then, the teller T1 may select "Deposit" from the menu on the banknote processing device 20 and set the external cassette 50 on the banknote processing device 20 (step 13).

The banknote processing device 20 may then read the unique number of the external cassette 50 and determine whether the external cassette 50 is appropriate. If the external cassette 50 is appropriate, the banknote processing device 20 may count the banknotes stored in the external cassette 50 and process the deposit (step 14). The teller terminal 40 then obtains the deposit information indicating the result of the deposit process. The teller T1 can then return from the teller counter C2 to the drive-through counter C1.

On the other hand, if a rejection occurs at the banknote processing device 20, the banknotes are returned to an outlet unit. This allows the teller T2 to recount them at the teller counter C2 (step 15). Alternatively, the teller T2 may enter the denomination and number of rejected banknotes into the teller terminal 40 and manually store the rejected banknotes in the banknote processing device 20. The teller T2 cannot perform the next process on the banknote processing device 20 until this process is completed.

Upon finishing the deposit process, the teller terminal 40 sends the deposit information obtained at step 14 to the drive-through terminal 30 (step 16). That is, the teller terminal 40 performs a process to notify the customer U1 of the deposit information obtained at step 14. For example, the teller terminal 40 may send the deposit information obtained at step 14 to an e-mail address of the customer U1, if the e-mail address has been registered. The deposit information may include the reject information obtained at step 15.

Finally, the teller T1 completes the deposit process by reading the deposit information, if it has been sent to the drive-through terminal 30 (step 17).

Figure 2:
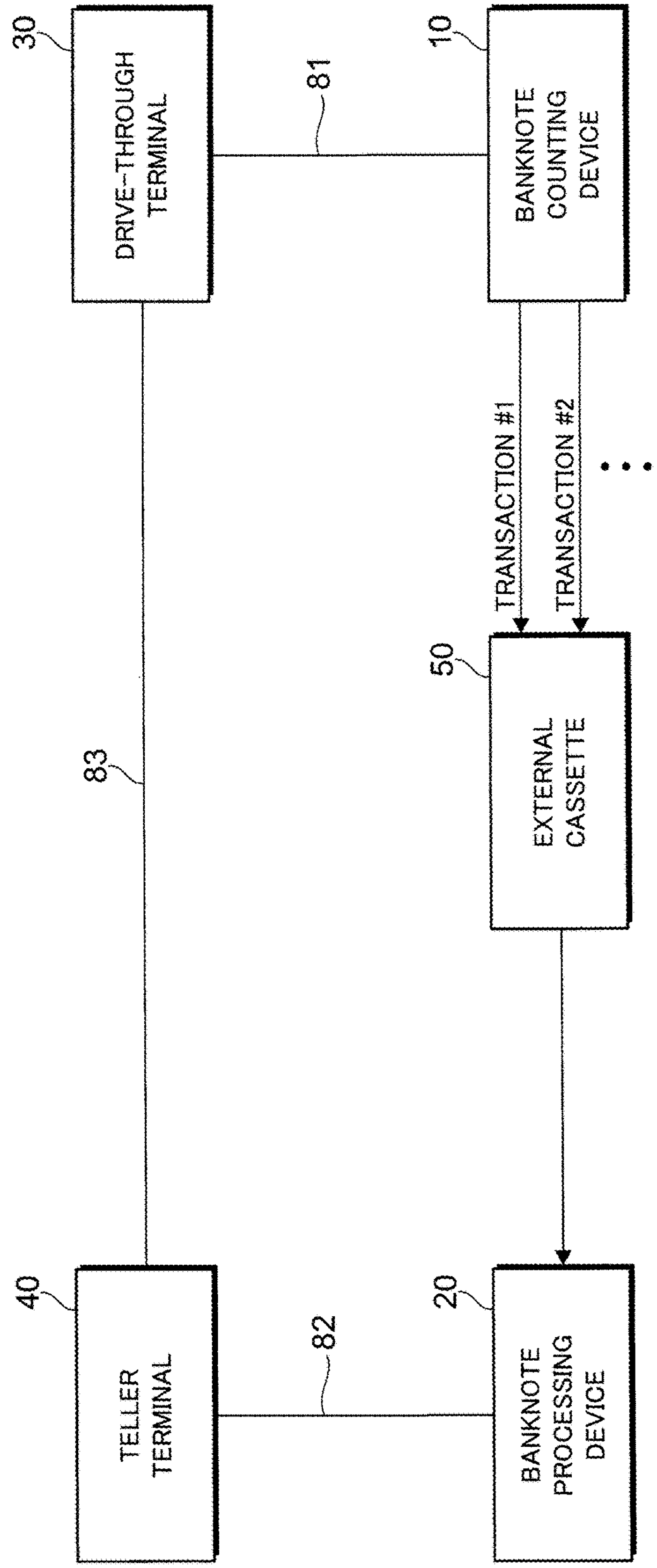
FIG. 2 shows an example of a banknote processing system in the first exemplary embodiment.

FIG. 2 shows an example configuration of a banknote processing system 1 in the first exemplary embodiment. As shown in FIG. 2, the banknote processing system 1 may include the banknote counting device 10, the banknote processing device 20, the drive-through terminal 30, the teller terminal 40, and the external cassette 50. The banknote counting device 10 and the drive-through terminal 30 may be connected via a communication line 81, and the banknote processing device 20 and the teller terminal 40 may be connected via a communication line 82. The drive-through terminal 30 and the teller terminal 40 may be connected via a communication line 83.

The banknote counting device 10 may be a device located at the drive-through counter C1, as described above. The banknote counting device 10 may count banknotes. The detailed configuration of the banknote counting device 10 is described below.

The banknote processing device 20 may be a device located at the teller counter C2, as described above. The banknote processing device 20 may receive banknotes from the external cassette 50 for deposit. The detailed configuration of the banknote processing device 20 is also described below.

The drive-through terminal 30 may be a terminal located at the drive-through counter C1, as described above. The drive-through terminal 30 may control the banknote counting device 10 via the communication line 81 and may exchange information with the teller terminal 40 via the communication line 83. The detailed configuration of the drive-through terminal 30 is also described below.

The teller terminal 40 may be a terminal located at the teller counter C2, as described above. The teller terminal 40 may control the banknote processing device 20 via the communication line 82 and may exchange information with the drive-through terminal 30 via the communication line 83. The detailed configuration of the teller terminal 40 is also described below.

The external cassette 50 may be a cassette that contains the banknotes counted by the banknote counting device 10 and is carried to deposit the banknotes into the banknote processing device 20, as described above. In the first exemplary embodiment, the banknotes may be stored in the external cassette 50 for each transaction. FIG. 2 shows this operation with multiple arrows from the banknote counting device 10 to the external cassette 50. When banknotes can no longer be stored in the external cassette 50, the drive-through terminal 30 may output warning information to that effect.

Figure 3:
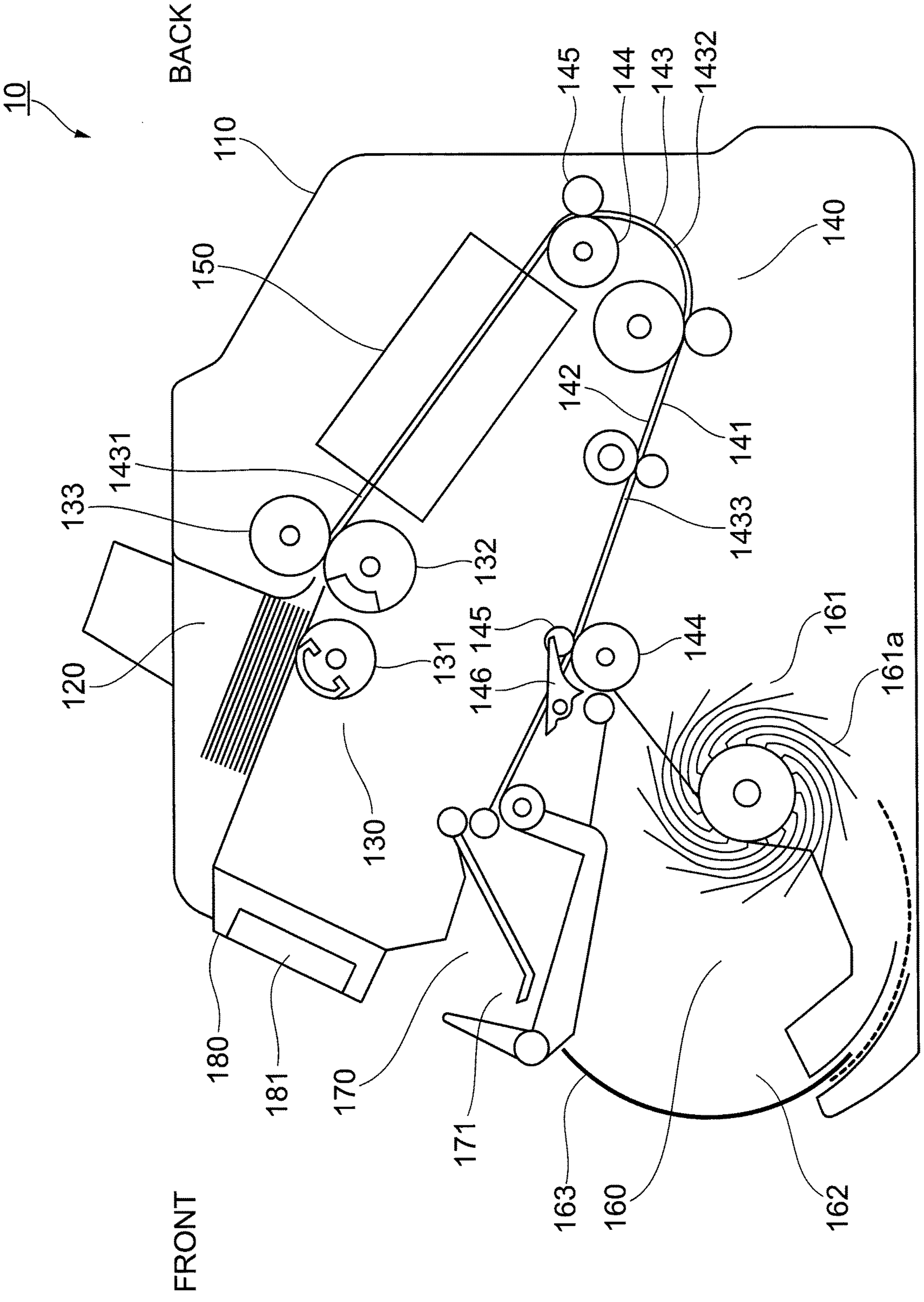
FIG. 3 shows a side view of an example configuration of a banknote counting device in the first exemplary embodiment.

FIG. 3 shows a side view of the banknote counting device 10 in the first exemplary embodiment.

As shown in FIG. 3, the banknote counting device 10 may include a housing 110, an inlet unit 120, a feeding-out unit 130, a conveyance unit 140, a recognition sensor 150, an outlet unit 160, a reject unit 170, and an operation display unit 180.

The housing 110 may define the contour of the banknote counting device 10. The inlet unit 120 may be provided in the front upper side of the housing 110. Banknotes to be processed may be placed in a stacked state in the inlet unit 120. The inlet unit 120 is an example of the claimed first inlet.

The feeding-out unit 130, the conveyance unit 140, and the recognition sensor 150 may be located within the housing 110. The feeding-out unit 130 may include multiple feeding-out rollers 131 to 133 and may feed the banknotes placed in the inlet unit 120 one by one to the conveyance unit 140. The multiple feed-out rollers 131 to 133 may be driven by a drive source such as a motor (not shown).

The conveyance unit 140 may convey the banknotes fed out from the feeding-out unit 130. The conveyance unit 140 may include guides 141 and 142, a driving roller 144, and a driven roller 145. The guides 141 and 142 may face each other with a predetermined gap. This gap may provide a conveyance path 143 for conveying the banknotes. The guides 141 and 142 may guide the conveyance of the banknotes while facing the front and back surfaces of the banknotes traveling along the conveyance path 143.

The conveyance path 143 may include a first conveyance path 1431, a second conveyance path 1432, and a third conveyance path 1433. The first conveyance path 1431 may be a conveyance path extending from the inlet unit 120. The second conveyance path 1432 may be a conveyance path that turns back in a U-shape from the end of the first conveyance path 1431. The third conveyance path 1433 may be a conveyance path extending from the end of the second conveyance path 1432. The driving roller 144 and the driven roller 145 may be positioned on the conveyance path 143 with their opposing portions facing each other. As the driving roller 144 rotates, the banknotes may be conveyed downstream along the conveyance path 143 while being sandwiched between the driving roller 144 and the driven roller 145. The conveyance unit 140 is an example of the claimed first conveyor.

The recognition sensor 150 may be provided on the first conveyance path 1431. The recognition sensor 150 may recognize at least the authenticity, denomination, and soundness of each banknote conveyed along the first conveyance path 1431. The recognition sensor 150 may also read a symbolic code number printed on each banknote. The recognition sensor 150 is an example of the claimed first recognition sensor. The symbolic code number is an example of the claimed serial number.

The third conveyance path 1433 may branch downstream into two conveyance paths. One of the two conveyance paths may lead to the outlet unit 160, and the other of the two conveyance paths may lead to the reject unit 170. A distributing member 146 may be provided where the conveyance path 143 branches into these two conveyance paths. The distributing member 146 may be driven by a drive source such as a motor (not shown), and may direct the banknote conveyed from the upstream to the conveyance path leading to the outlet unit 160 or to the conveyance path leading to the reject unit 170.

The outlet unit 160 may be provided in the front lower side of the housing 110. The outlet unit 160 may be provided with an impeller 161 at its rear location. The impeller 161 may be driven by a drive source such as a motor (not shown).

The impeller 161 may be provided with outwardly extending vanes 161*a* at equal intervals on its outer surface. The impeller 161 may receive banknotes conveyed from the conveyance unit 140 one by one between two vanes 161*a* and may convey the received banknotes to the outlet unit 160. The banknotes conveyed by the impeller 161 may be accumulated in an aligned state in the outlet unit 160.

The outlet unit 160 may be provided on the front with an outlet opening 162 for taking out banknotes. The outlet opening 162 is opened and closed by a shutter 163. The shutter 163 is moved by a drive source (not shown) between a closed position and an open position. The outlet unit 160 is an example of the claimed first outlet.

The reject unit 170 may be provided above the outlet unit 160. The reject unit 170 may be provided on the front with a take-out opening 171 for taking out banknotes. The operation display unit 180 may be provided above the reject unit 170. The operation display unit 180 may include a touch panel 181 that is capable of displaying information and receiving input. The touch panel 181 may display information about the results of the counting process, i.e., the number of banknotes of each denomination, the total amount, and the like. The touch panel 181 may also be used for setting of various modes of the counting process and for operations in the counting process. The touch panel 181 may be composed of a display such as an LCD, and multiple operation keys.

When the counting process is started, the banknotes in the inlet unit 120 may be fed out one by one by the feeding-out unit 130 and conveyed by the conveyance unit 140. The banknotes may be recognized and counted by the recognition sensor 150 while traveling down the first conveyance path 1431. Normal banknotes, which are neither damaged nor counterfeit, and banknotes of which the denomination has been identified, may be conveyed to the outlet unit 160 for accumulation. Rejected banknotes, which are damaged or counterfeit banknotes or banknotes of which the denomination cannot be identified, may be conveyed to the reject unit 170 for accumulation. At the outlet unit 160, the shutter 163 may be closed while the counting process is being performed. The number of banknotes of each denomination and the total amount may be displayed on the touch panel 181 in real time.

Figure 4:
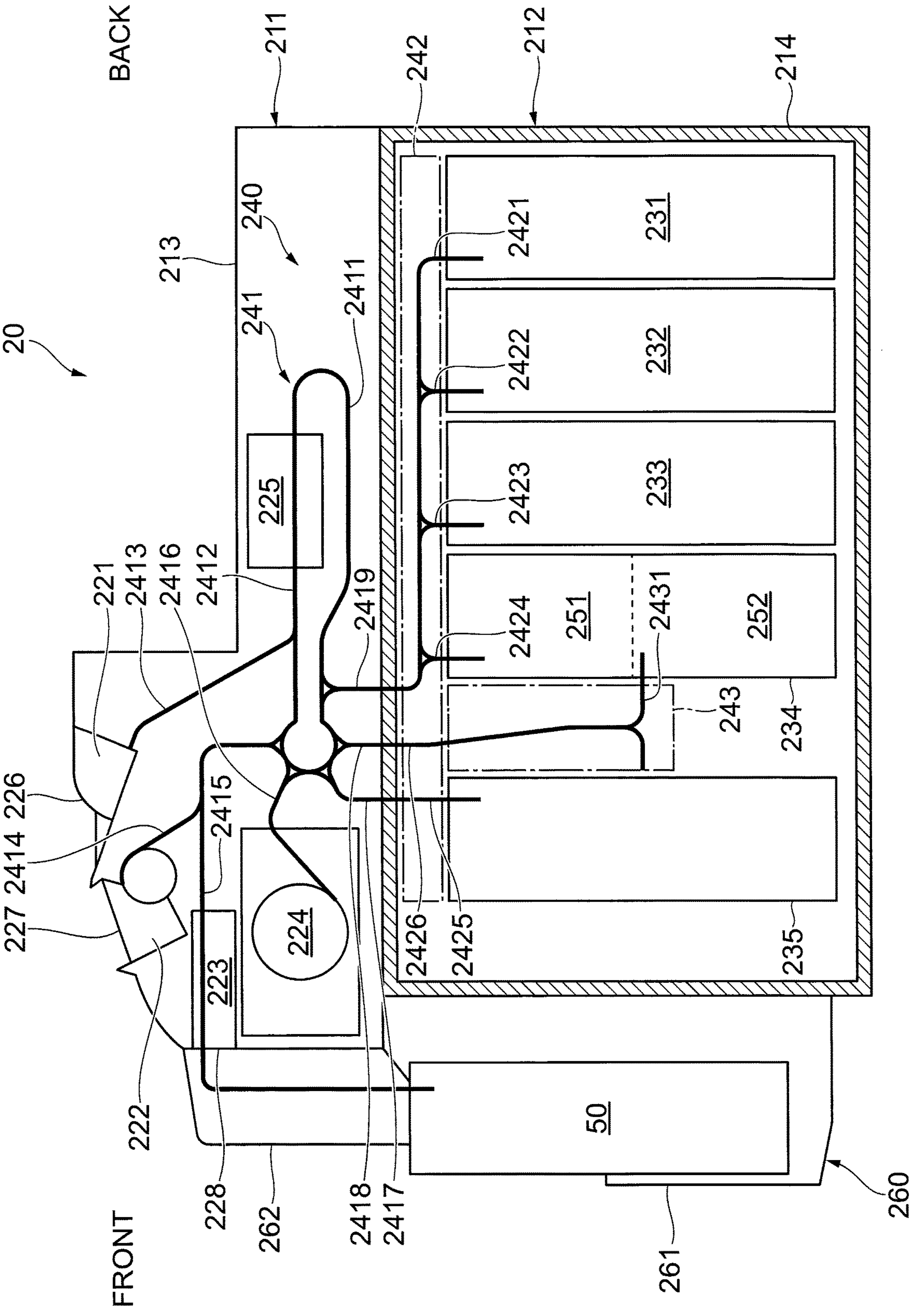
FIG. 4 shows a side view of an example configuration of a banknote processing device in the first exemplary embodiment.

FIG. 4 shows a side view of the banknote processing device 20 in the first exemplary embodiment. The banknote processing device 20 may be configured to be capable of using the external cassette 50. The banknote processing device 20 may include a mounting unit 260. The external cassette 50 may be removably attached to the mounting unit 260. The mounting unit 260 may mechanically be locked to prevent attachment thereto of the external cassette 50 in cases where the external cassette 50 need not be used.

As shown in FIG. 4, the banknote processing device 20 may include a processing part 211 at the top and a safe box part 212 at the bottom.

The processing part 211 may be composed of an upper housing 213. The upper housing 213 may include an inlet unit 221, an outlet unit 222, a first front conveyance unit 223, a temporary storage unit 224, a recognition sensor 225, and an upper conveyance unit 241. The upper conveyance unit 241 may be part of a conveyance unit 240.

The inlet unit 221 may be used to insert banknotes to be deposited, for example, during a deposit process. The inlet unit 221 may include an inlet opening 226. An operator can manually insert banknotes into the inlet unit 221 through the inlet opening 226. The inlet unit 221 can hold multiple banknotes in a stacked state. The inlet unit 221 may have a mechanism to take banknotes into the banknote processing device 20 one by one. The inlet unit 221 is an example of the claimed second inlet.

The outlet unit 222 may be given banknotes that have been fed out from any of storage units, for example, during a withdrawal process. The outlet unit 222 may also be given banknotes that are not determined to be normal banknotes, for example, during a replenishment or collection process. The outlet unit 222 can hold multiple banknotes in a stacked state. The outlet unit 222 may include an outlet opening 227. An operator can manually remove banknotes accumulated in the outlet unit 222 through the outlet opening 227. The outlet opening 227 may be provided with a shutter (not shown) that opens and closes the outlet opening 227.

The first front conveyance unit 223 may convey banknotes. The first front conveyance unit 223 may be located at the front within the upper housing 213. The first front conveyance unit 223 may be connected to the mounting unit 260. The processing part 211 may have a connecting opening 228. The connecting opening 228 may open forward at the front of the upper housing 213. The first front conveyance unit 223 may have a shutter (not shown). The shutter may open and close the connecting opening 228. When the shutter opens, the mounting unit 260 may engage the first front conveyance unit 223 via the connecting opening 228. The first front conveyance unit 223 and the mounting unit 260 may be connected to each other.

As shown by the thick solid line in FIG. 4, the first front conveyance unit 223 may have a conveyance path. The conveyance path may connect the mounting unit 260 with a fifth upper conveyance path 2415 described below. As described below, banknotes conveyed from the mounting unit 260 may be conveyed along the conveyance path of the first front conveyance unit 223 toward the fifth upper conveyance path 2415. Also, banknotes conveyed from the fifth upper conveyance path 2415 may be conveyed along the conveyance path of the first front conveyance unit 223 toward the mounting unit 260.

The temporary storage unit 224 may temporarily store banknotes to be deposited, for example, during the deposit process. The temporary storage unit 224 may also temporarily store banknotes that are not determined to be normal banknotes, for example during a replenishment or collection process. The temporary storage unit 224 can feed out banknotes that have been stored therein. The temporary storage unit 224 may be located at the front position in the upper housing 213. The temporary storage unit 224 may be located below the first front conveyance unit 223. The temporary storage unit 224 may be a tape-type storage unit. The temporary storage unit 224 may store banknotes by wrapping them around the drum with the tape. The tape-type storage unit has the advantage that the order of banknotes does not change when storing and unloading the banknotes. The tape-based storage unit also has the advantage that it can store a mixture of banknotes of various sizes. The temporary storage unit 224 can employ a well-known configuration of a tape-type storage unit.

The recognition sensor 225 may be provided on the upper conveyance unit 241. The recognition sensor 225 may recognize at least the authenticity, denomination, and soundness of each banknote conveyed along the upper conveyance unit 241. The recognition sensor 225 may also read a symbolic code number printed on each banknote. The recognition sensor 225 is an example of the claimed second recognition sensor. The symbolic code number is an example of the claimed serial number.

The safe box part 212 may be composed of a safe box housing 214. The safe box housing 214 may include multiple storage units 231 to 235 and lower conveyance units 242 and 243. The lower conveyance units 242 and 243 may be part of the conveyance unit 240. The safe box housing 214 may protect the multiple storage units 231 to 235 with a predetermined level of security. Specifically, the safe box housing 214 may be formed by a metal plate of a predetermined thickness or greater. The security level of the safe box housing 214 may be higher than that of the upper housing 213.

The first to third storage units 231 to 233 and the fifth storage unit 235 may have the same configuration. The first to third storage units 231 to 233 and the fifth storage unit 235 may each be a stack-type storage unit, although detailed illustrations are omitted. The stack-type storage unit stores banknotes by stacking them on top of each other. The first to third storage units 231 to 233 and the fifth storage unit 235 may each contain one storage space. The first to third storage units 231 to 233 and the fifth storage unit 235 may also each have a conveyance mechanism. The conveyance mechanism may store banknotes from outside to inside the storage unit and may feed out banknotes from inside to outside the storage unit.

The fourth storage unit 234 may include the first storage space 251 and the second storage space 252. The first storage space 251 may be provided on the top side. The second storage space 252 may be provided below the first storage space 251. The first storage space 251 and the second storage space 252 may be independent of each other. The fourth storage unit 234 may have the first conveyance mechanism for the first storage space 251 and the second conveyance mechanism for the second storage space 252. The fourth storage unit 234 can store banknotes in the first storage space 251 and feed out the banknotes from the first storage space 251, and can store banknotes in the second storage space 252 and feed out the banknotes from the second storage space 252.

The first to fourth storage unit 231 to 234 may each store banknotes of different denominations. The first to fourth storage unit 231 to 234 may each store banknotes for withdrawal. The fifth storage unit 235 may store banknotes that are not to be stored in any of the first to fourth storage units 231 to 234. The fifth storage unit 235 may not store banknotes for withdrawal. The fifth storage unit 235 may store banknotes to be collected from the banknote processing device 20. Each of the first to fourth storage units 231 to 234 is an example of the claimed internal storage.

The conveyance unit 240 may convey banknotes one by one within the banknote processing device 20, with spaces between each banknote. The conveyance unit 240 may include conveyance paths. The conveyance paths may be composed of a combination of multiple rollers, multiple belts, a motor driving these, and multiple guides, which are not shown. The conveyance unit 240 may convey the banknote, for example, with its long edge leading. The conveyance unit 240 may convey the banknote, for example, with its short edge leading.

The conveyance unit 240 may include the upper conveyance unit 241 and the lower conveyance units 242 and 243. The upper conveyance unit 241 may be provided in the upper housing 213, as described above. The lower conveyance units 242 and 243 may be provided in the safe box housing 214, as described above. Three conveyance paths may be formed in the vertical direction through the upper wall defining the safe box housing 214. The three conveyance paths may connect the upper conveyance unit 241 to the lower conveyance units 242 and 243.

The upper conveyance unit 241 may include first to ninth upper conveyance paths 2411 to 2419. The lower conveyance unit 242 may include first to sixth lower conveyance paths 2421 to 2426. The lower conveyance unit 243 may include a seventh lower conveyance path 2431. The conveyance unit 240 is an example of the claimed second conveyor.

The external cassette 50 may be connected to the banknote processing device 20 via the mounting unit 260, as described above. The mounting unit 260 may include a mounter 261 and a second front conveyance unit 262, although shown diagrammatically in FIG. 4.

The external cassette 50 may be a stack-type storage cassette, although not shown in detail. The external cassette 50 may have a conveyance mechanism. The conveyance mechanism may introduce banknotes from the outside into the inside of the external cassette 50 and store the banknotes inside the external cassette 50. The conveyance mechanism may also eject banknotes stored in the external cassette 50 from the inside to the outside of the external cassette 50.

The external cassette 50 may have substantially the same structure as the first to third storage units 231 to 233 and the fifth storage unit 235. The external cassette 50 may also have the same external dimensions as the first to fifth storage units 231 to 235. The external cassette 50 may be removably attached to the safe box housing 214 in the same position in which the first to fifth storage units 231 to 235 are placed. The external cassette 50 may be repurposed as the first to third storage units 231 to 233 and the fifth storage unit 235.

The external cassette 50 may be mounted on the mounter 261. The mounter 261 may hold the external cassette 50.

The second front conveyance unit 262 may be connected to the connecting opening 228 of the first front conveyance unit 223. The second front conveyance unit 262 may have a conveyance path, as shown by the thick solid line in FIG. 4. This conveyance path may connect the conveyance path of the first front conveyance unit 223 with the external cassette 50. The second front conveyance unit 262 conveys banknotes fed out from the external cassette 50 to the first front conveyance unit 223. The second front conveyance unit 262 may also convey banknotes sent from the first front conveyance unit 223 to the external cassette 50.

Figure 5:
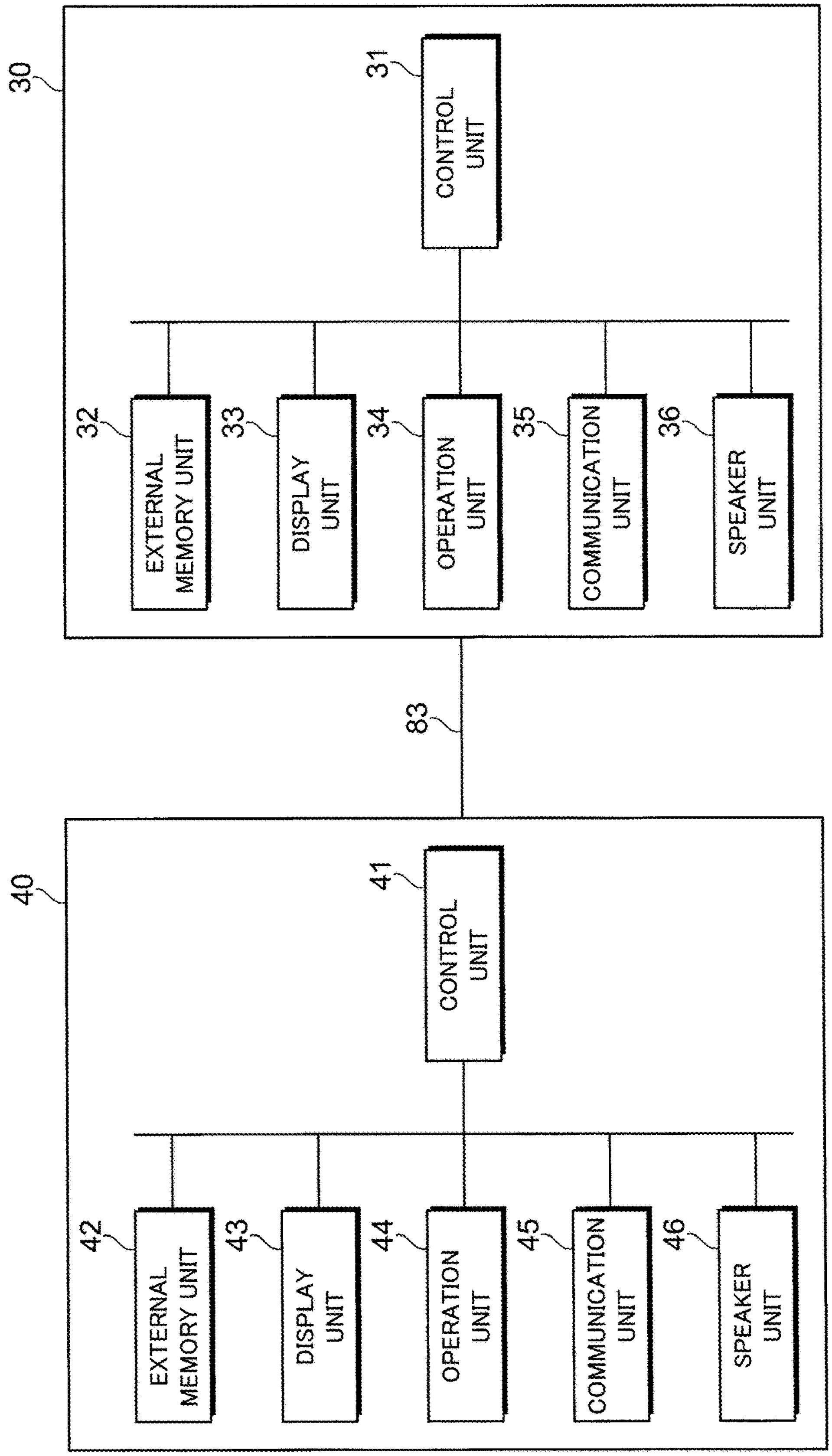
FIG. 5 shows a block diagram of a drive-through terminal and a teller terminal in the first exemplary embodiment.

FIG. 5 shows a block diagram of the drive-through terminal 30 and the teller terminal 40 in the first exemplary embodiment.

First, an example configuration of the drive-through terminal 30 is described.

As shown in FIG. 5, the drive-through terminal 30 may include a control unit 31, an external memory unit 32, a display unit 33, an operation unit 34, a communication unit 35, and a speaker unit 36.

The control unit 31 may control the entire drive-through terminal 30. The control unit 31 may include a central processing unit (CPU), a read only memory (ROM), and a random access memory (RAM). The ROM may store the basic program (operating system) to be executed by the CPU, various settings, and the like. The CPU may execute application programs read from the ROM or the external memory unit 32 while using the RAM as a work area.

The control unit 31 may obtain from the banknote counting device 10 the account information about the customer who requested the deposit and the counting results of the banknotes to be deposited. The counting results may include the denominations and the symbolic code numbers of the banknotes. The control unit 31 may calculate the cumulative number of banknotes counted by the banknote counting device 10 and store it in the external memory unit 32. The control unit 31 may output warning information when the cumulative number of banknotes exceeds the upper limit of banknotes that can be stored in the external cassette 50. For example, the control unit 31 may control the display unit 33 to output the warning information. Alternatively, the control unit 31 may control the speaker unit 36 to output the warning information.

The control unit 31 may send a reservation command for deposit processing to the teller terminal 40 when the cumulative number of banknotes exceeds the upper limit of banknotes that can be stored in the external cassette 50. The reservation command for deposit processing may be a command that, when banknote processing is being executed by the banknote processing device 20, commands the teller terminal 40 to wait for the banknote processing to finish and then commands the teller terminal 40 to perform the deposit processing once the banknote processing has finished. The reservation command for deposit processing may include the counting results obtained from the banknote counting device 10.

The control unit 31 may send an interruption command for deposit processing to the teller terminal 40 when the cumulative number of banknotes exceeds the upper limit of banknotes that can be stored in the external cassette 50. The control unit 31 may send an interruption command for deposit processing, for example, when banknotes accepted at the drive-through counter C1 need to be processed urgently. The interruption command for deposit processing may be a command that, when banknote processing is being executed by the banknote processing device 20, commands the teller terminal 40 to suspend the banknote processing and then commands the teller terminal 40 to perform the deposit processing. The interruption command for deposit processing may include the counting results obtained from the banknote counting device 10.

When the cumulative number of banknotes exceeds the upper limit of banknotes that can be stored in the external cassette 50, the control unit 31 may command the rack 70, which stores the spare external cassette 51 in a locked state, to release the lock. The teller T1 may then store the banknotes in the spare external cassette 51. The banknotes stored in the spare external cassette 51 may then be gathered and stored in the banknote processing device 20 after close of business.

The control unit 31 may prompt the teller T1 to store banknotes in the external cassette 50 if the cumulative number of banknotes does not exceed the upper limit of banknotes that can be stored in the external cassette 50. At this time, the control unit 31 may prompt the teller T1 to place a separator at the boundary of the banknotes for each transaction. The separator may also contain a customer's account information. If such a separator is given to the customer, the process of obtaining account information from the card may be omitted. The separator is also called a header card when it is placed at the beginning of the banknotes for each transaction, or a trailer card when it is placed at the end of the banknotes for each transaction.

The control unit 31 may acquire an image of the area around the drive-through counter C1 from the camera 60 and analyze this image. As a result, if an abnormality is detected in the image, the control unit 31 may output warning information. For example, if suspicious movement of the teller T1 is detected in the image, the control unit 31 may output warning information.

The external memory unit 32 may store data and the like used for processing by the control unit 31. The external memory unit 32 may be, for example, a hard disk drive (HDD). In particular, in the first exemplary embodiment, the external memory unit 32 may re-writably store the upper limit of banknotes that can be stored in the external cassette 50. The external memory unit 32 is an example of the claimed memory.

The display unit 33 may display information for an operator. The display unit 33 may be a device that displays still images, moving images, and the like. The display unit 33 may be, for example, a liquid crystal display, an organic EL display, and the like. The display unit 33 is an example of the claimed display.

The operation unit 34 may accept input operations of an operator. The operation unit 34 may be, for example, a mouse, a keyboard, a touch panel, and the like.

The communication unit 35 may communicate with the banknote counting device 10 and the teller terminal 40. The communication unit 35 may be a communication interface for wired or wireless communication with the banknote counting device 10 and the teller terminal 40.

The speaker unit 36 may output audible information for an operator. The speaker unit 36 is an example of the claimed speaker.

Next, an example configuration of the teller terminal 40 is described.

As shown in FIG. 5, the teller terminal 40 may include a control unit 41, an external memory unit 42, a display unit 43, an operation unit 44, a communication unit 45, and a speaker unit 46.

The control unit 41 may control the entire teller terminal 40. The control unit 41 may include a CPU, a ROM, and a RAM. The ROM may store the basic program (operating system) to be executed by the CPU, various settings, and the like. The CPU may execute application programs read from the ROM or the external memory unit 42 while using the RAM as a work area.

The control unit 41 may receive a reservation command for deposit processing from the drive-through terminal 30. At that time, assume that banknote processing is being executed by the banknote processing device 20 in response to the operation of the teller T2 and the like. Even in such a case, the banknote processing device 20 may be unlocked to allow the external cassette 50 to be mounted outside the safe box housing 214. The banknote processing device 20 may then perform the deposit processing after the ongoing banknote processing is completed. The deposit processing may be processing of taking banknotes from the external cassette 50 and storing them in any of the first to fifth storage units 231 to 235.

The control unit 41 may receive an interruption command for deposit processing from the drive-through terminal 30. At that time, assume that banknote processing is being executed by the banknote processing device 20 in response to the operation of the teller T2 and the like. Even in such a case, the banknote processing device 20 may be unlocked to allow the external cassette 50 to be mounted outside the safe box housing 214. The banknote processing device 20 may then temporarily suspend the ongoing banknote processing and perform the deposit processing. The deposit processing may be processing of taking banknotes from the external cassette 50 and storing them in any of the first to fifth storage units 231 to 235.

The control unit 41 may obtain the counting results from the banknote processing device 20. The counting results may include the denominations and the symbolic code numbers of the banknotes. The control unit 41 may then check the counting results obtained from the drive-through terminal 30 against the counting results obtained from the banknote processing device 20. In particular, the control unit 41 may check whether the counting results are consistent with each other by comparing the symbolic code numbers from the drive-through terminal 30 with the symbolic code numbers from the banknote processing device 20. If the control unit 41 confirms that the counting results are consistent with each other, it may send deposit information indicating completion of the deposit processing to the drive-through terminal 30 and the like.

The external memory unit 42 may store data and the like used for processing by the control unit 41. The external memory unit 42 may be, for example, an HDD.

The display unit 43 may display information for an operator. The display unit 43 may be a device that displays still images, moving images, and the like. The display unit 43 may be, for example, a liquid crystal display, an organic EL display, and the like.

The operation unit 44 may accept input operations of an operator. The operation unit 44 may be, for example, a mouse, a keyboard, a touch panel, and the like.

The communication unit 45 may communicate with the banknote processing device 20 and the drive-through terminal 30. The communication unit 45 may be a communication interface for wired or wireless communication with the banknote processing device 20 and the drive-through terminal 30.

The speaker unit 46 may output audible information for an operator.

Figure 6:
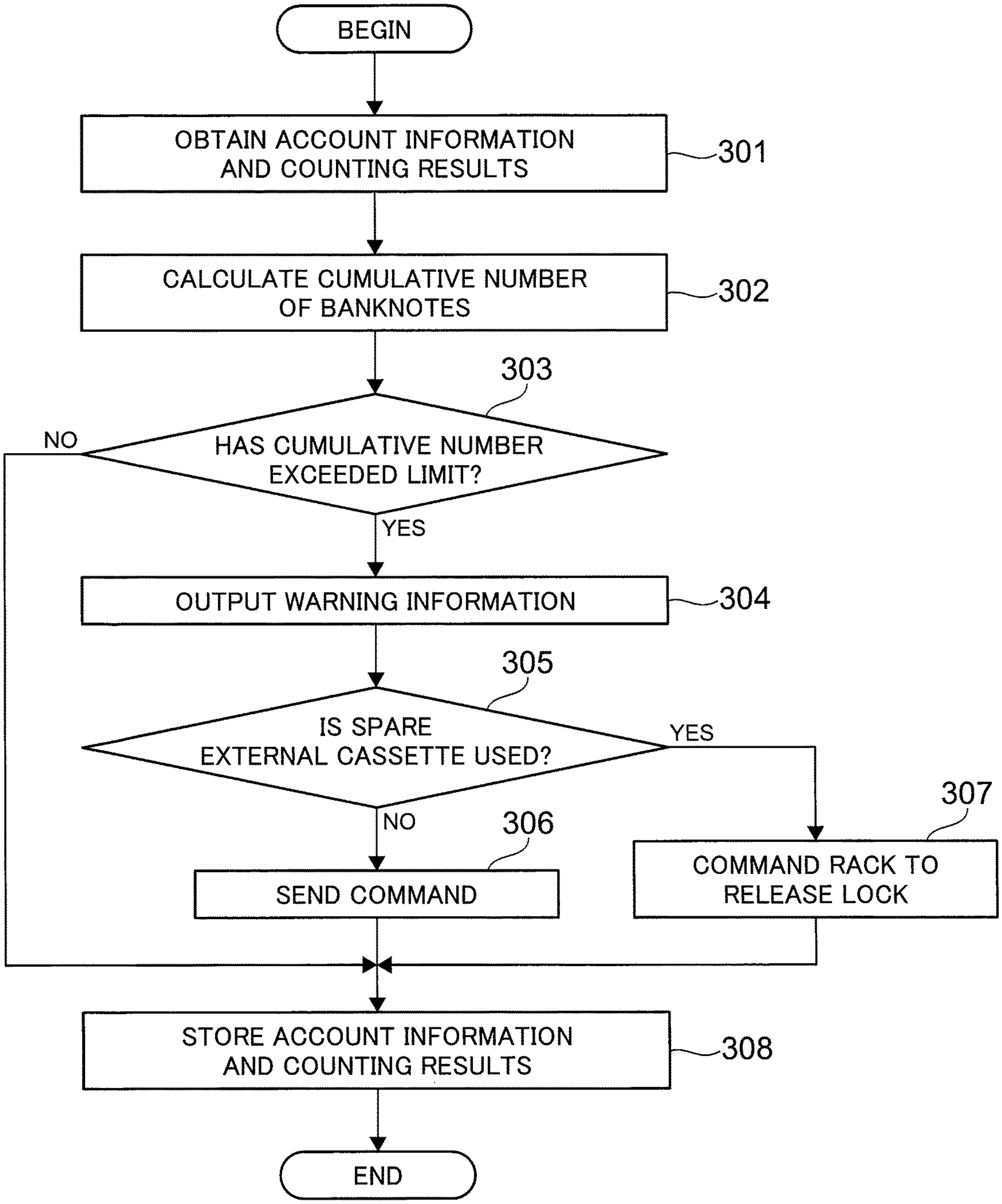
FIG. 6 is a flowchart showing an example of the operation of a drive-through terminal in the first exemplary embodiment.

FIG. 6 is a flowchart showing an example of the operation of the drive-through terminal 30 in the first exemplary embodiment. Technically, this example operation is executed by the control unit 31 of the drive-through terminal 30, but the following description assumes that the drive-through terminal 30 performs this operation. In summary, banknotes are accepted from the customer U1 and stored in the external cassette 50 at the drive-through counter C1 through steps 301 to 308.

As shown in FIG. 6, the drive-through terminal 30 may first obtain account information and counting results from the banknote counting device 10 (step 301). Here, the counting results may include the denominations and the symbolic code numbers of banknotes. Next, the drive-through terminal 30 may calculate the cumulative number of banknotes using the counting results obtained at step 301 (step 302). The drive-through terminal 30 may then determine whether the cumulative number of banknotes calculated at step 302 exceeds the upper limit of banknotes that can be stored in the external cassette 50 (step 303).

If it is determined at step 303 that the cumulative number does not exceed the upper limit, the drive-through terminal 30 may store the account information and counting results in the external memory unit 32 (step 308). In this case, the teller T1 will store the banknotes to be deposited in the external cassette 50 currently in use. Thus, the drive-through terminal 30 may store the account information and counting results in association with the external cassette 50 currently in use. The drive-through terminal 30 may then terminate the process.

On the other hand, if it is determined at step 303 that the cumulative number has exceeded the upper limit, the drive-through terminal 30 may output warning information (step 304). Here, the warning information may be, for example, a message such as "the external cassette is full, please go to the banknote processing device for storage." In response, the teller T1 can choose to store the banknotes, stored in the external cassette 50, in the banknote processing device 20, or to store received banknotes in the spare external cassette 51. The drive-through terminal 30 may then determine whether or not information indicating the use of the spare external cassette 51 has been entered from the teller T1 (step 305).

If it is determined at step 305 that no information has been entered indicating the use of the spare external cassette 51, the drive-through terminal 30 may send a command to the teller terminal 40 (step 306). Here, the command may be a reservation command or an interruption command. The reservation command may be a command that commands the teller terminal 40, when banknote processing is being executed by the banknote processing device 20, to wait until the banknote processing is completed before performing counting. The interruption command may be a command that commands the teller terminal 40, when the banknote processing is being executed by the banknote processing device 20, to suspend the banknote processing and perform counting. The teller T1 may decide whether to send a reservation command or an interruption command, depending on urgency. The command may also include account information and counting results, regardless of whether it is a reservation or interruption command. The drive-through terminal 30 may then store the account information and counting results in the external memory unit 32 (step 308). In this case, the teller T1 will store the banknotes to be deposited in the next external cassette 50 to be used. Thus, the drive-through terminal 30 may store the account information and counting results in association with the next external cassette 50 to be used. The drive-through terminal 30 may then terminate the process.

If it is determined at step 305 that the information indicating the use of the spare external cassette 51 has been entered, the drive-through terminal 30 may command the rack 70 to release a lock of the spare external cassette 51 (step 307). The drive-through terminal 30 may then store the account information and counting results in the external memory unit 32 (step 308). In this case, the teller T1 will store the banknotes to be deposited in the spare external cassette 51. Thus, the drive-through terminal 30 may store the account information and counting results in association with the spare external cassette 51. The drive-through terminal 30 may then terminate the process.

Figure 7:
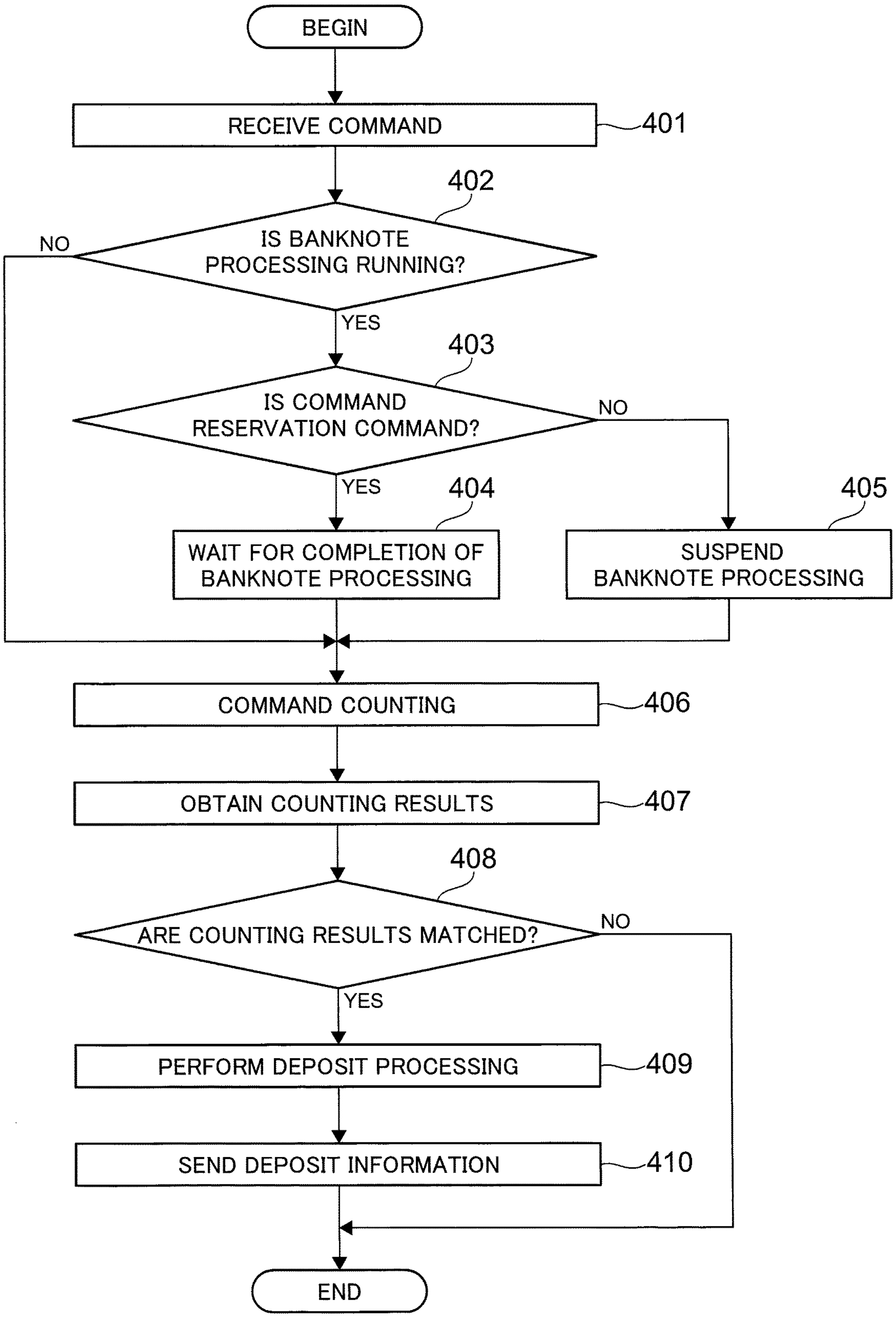
FIG. 7 is a flowchart showing an example of the operation of a teller terminal in the first exemplary embodiment.

FIG. 7 is a flowchart showing an example of the operation of the teller terminal 40 in the first exemplary embodiment. Technically, this example operation is executed by the control unit 41 of the teller terminal 40, but the following description assumes that the teller terminal 40 performs this operation. In summary, banknotes stored in the external cassette 50 at the drive-through counter C1 are processed at the teller counter C2 through steps 401 to 410.

As shown in FIG. 7, the teller terminal 40 may first receive a command from the drive-through terminal 30 (step 401). Here, the command may include account information and counting results, as described above. Next, the teller terminal 40 determines whether banknote processing is running in the banknote processing device 20 (step 402).

If it is determined at step 402 that banknote processing is not running in the banknote processing device 20, the teller terminal 40 may command the banknote processing device 20 to count the banknotes (step 406). Thus, the banknote processing device 20 may take in the banknotes from the external cassette 50 and store them in any of the first to fifth storage units 231 to 235, if the external cassette 50 is attached.

On the other hand, if it is determined at step 402 that banknote processing is running in the banknote processing device 20, the teller terminal 40 may determine whether the command received at step 401 is a reservation command (step 403).

If it is determined at step 403 that the command is a reservation command, the teller terminal 40 may wait for the banknote processing device 20 to complete the ongoing banknote processing (step 404). Once the ongoing banknote processing is completed, the teller terminal 40 may command the banknote processing device 20 to count the banknotes (step 406). Thus, the banknote processing device 20 may take in the banknotes from the external cassette 50 and store them in any of the first to fifth storage units 231 to 235, if the external cassette 50 is attached.

On the other hand, if it is determined at step 403 that the command is not a reservation command, i.e., the command is an interruption command, the teller terminal 40 may command the banknote processing device 20 to suspend the ongoing banknote processing (step 405). Once the ongoing banknote processing is suspended, the teller terminal 40 may command the banknote processing device 20 to count the banknotes (step 406). Thus, the banknote processing device 20 may take in the banknotes from the external cassette 50 and store them in any of the first to fifth storage units 231 to 235, if the external cassette 50 is attached.

As described above, the mounting unit 260 may mechanically be locked to prevent attachment thereto of the external cassette 50 in cases where the external cassette 50 need not be used. In this case, prior to step 406 (i.e. after step 402, 404, or 405), the mounting unit 260 may be switched from a locked state to an unlocked state to allow for attachment thereto of the external cassette 50. Alternatively, after step 401, the mounting unit 260 may be switched from a locked state to an unlocked state to allow for attachment thereto of the external cassette 50.

Next, the teller terminal 40 may obtain the counting results of the banknotes from the banknote processing device 20 (step 407). Then, the teller terminal 40 may determine whether the counting results included in the command received at step 401 and the counting results obtained at step 407 are matched with each other (step 408).

If the counting results are determined to be matched with each other at step 408, the teller terminal 40 may perform deposit processing (step 409). The deposit processing is processing of increasing the balance in the customer's account, as indicated by the account information, by the amount corresponding to the denomination and number counted by the banknote processing device 20. Once the deposit processing has been completed, the teller terminal 40 may send deposit information to the drive-through terminal 30, indicating the completion of the deposit processing (step 410).

Second Exemplary Embodiment

Figure 8:
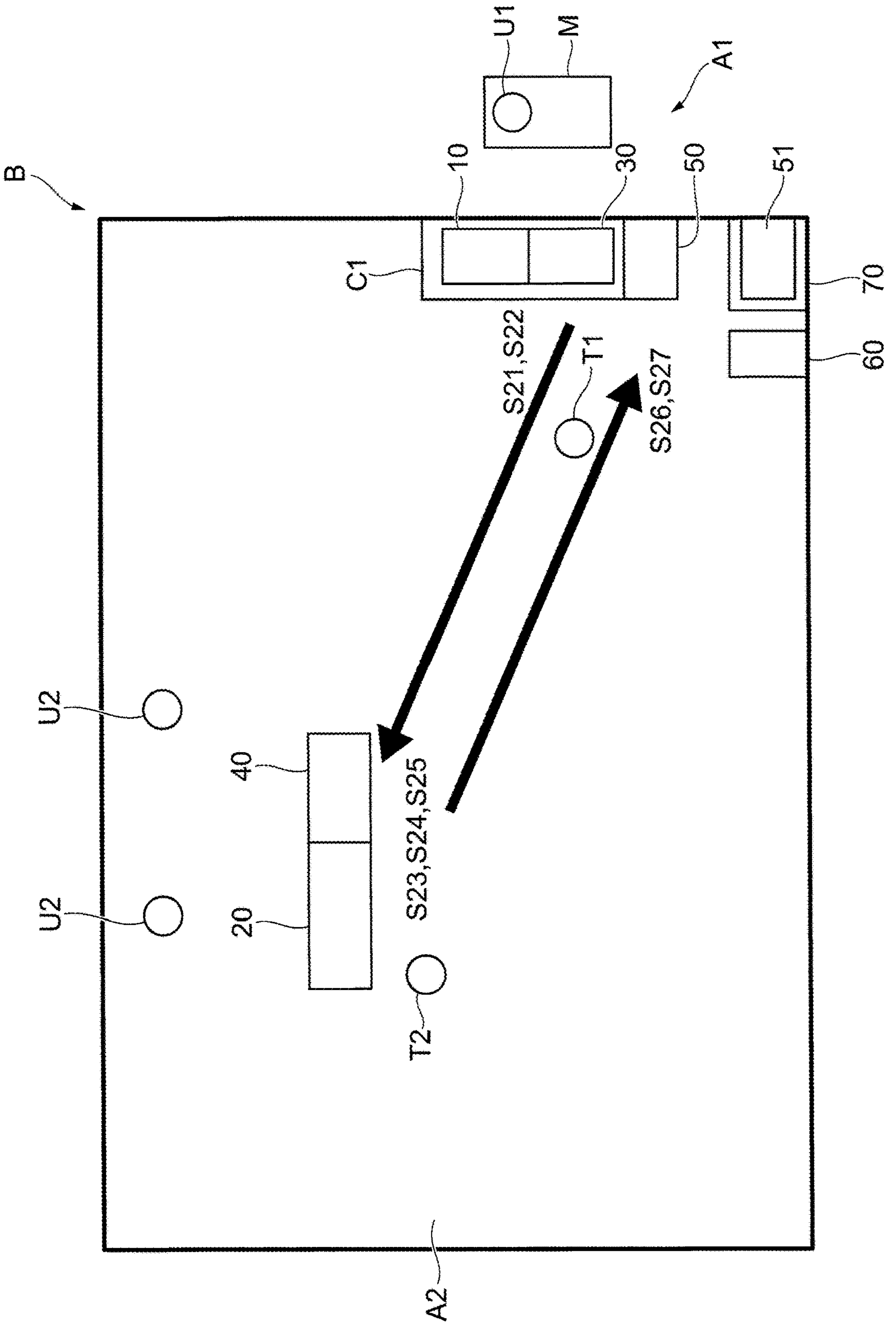
FIG. 8 shows an example of the layout of a bank according to a second exemplary embodiment.

FIG. 8 shows an example layout of a bank B according to a second exemplary embodiment. As shown in FIG. 8, the bank B may face a drive-through A1 and may include a bank lobby A2.

A drive-through counter C1 may be placed facing the drive-through A1. At the drive-through counter C1, a teller T1 may provide banking services to a customer U1 who is still in a car M. The drive-through counter C1 may be equipped with a banknote counting device 10 and a drive-through terminal 30. The banknote counting device 10 may be a device that does not have a safe and is dedicated to counting banknotes. The banknote counting device 10 is an example of the claimed first media processing device. The drive-through terminal 30 may be a terminal device that is connected to the banknote counting device 10 and controls the banknote counting device 10. The drive-through counter C1 may also initially include an external cassette 50. The external cassette 50 is an example of the claimed external storage. Although only one drive-through counter is shown here, there may be multiple drive-through counters.

In the bank lobby A2, a customer U2 who walks in may receive banking services. The bank lobby A2 may be distant from the drive-through counter C1. The bank lobby A2 may be equipped with a banknote processing device 20 and a teller terminal 40. The banknote processing device 20 may be a device that has a safe and takes banknotes from outside the safe and stores them inside the safe. The banknote processing device 20 is an example of the claimed second media processing device. In the second exemplary embodiment, the banknote processing device 20 may be a self-service machine or an automatic teller machine (ATM). The self-service machine is a device used by a customer U2 or a teller T2 to process banknotes himself/herself by reading his/her information with a card reader and the like. The ATM is a device used by a customer U2 to process banknotes himself/herself by reading his/her information with a card reader and the like. The self-service machine or the ATM is an example of the claimed device used by a customer to process media. The teller terminal 40 may be a terminal device that is connected to the banknote processing device 30 and controls the banknote processing device 30.

A camera 60 and a rack 70 may additionally be provided near the drive-through counter C1. The camera 60 may be connected to the drive-through terminal 30 and may capture images around the drive-through counter C1. The rack 70 may be connected to the drive-through terminal 30 and may store a spare external cassette 51 in a locked state. The spare external cassette 51 is an example of the claimed spare external storage.

In the following, the drive-through terminal 30 and the teller terminal 40 are configured as separate devices, but this is not limiting. The drive-through terminal 30 and the teller terminal 40 may be configured as a single device, except for respective displays corresponding to the banknote counting device 10 and the banknote processing device 20. In cases where the drive-through terminal 30 and the teller terminal 40 are configured as a single device, the single device is an example of the claimed computer.

The general actions of the tellers T1 and T2 in the second exemplary embodiment are similar to those of the tellers T1 and T2 in the first exemplary embodiment. That is, steps 21 to 27 in FIG. 8 are the same as steps 11 to 17 in FIG. 1.

Third Exemplary Embodiment

Figure 9:
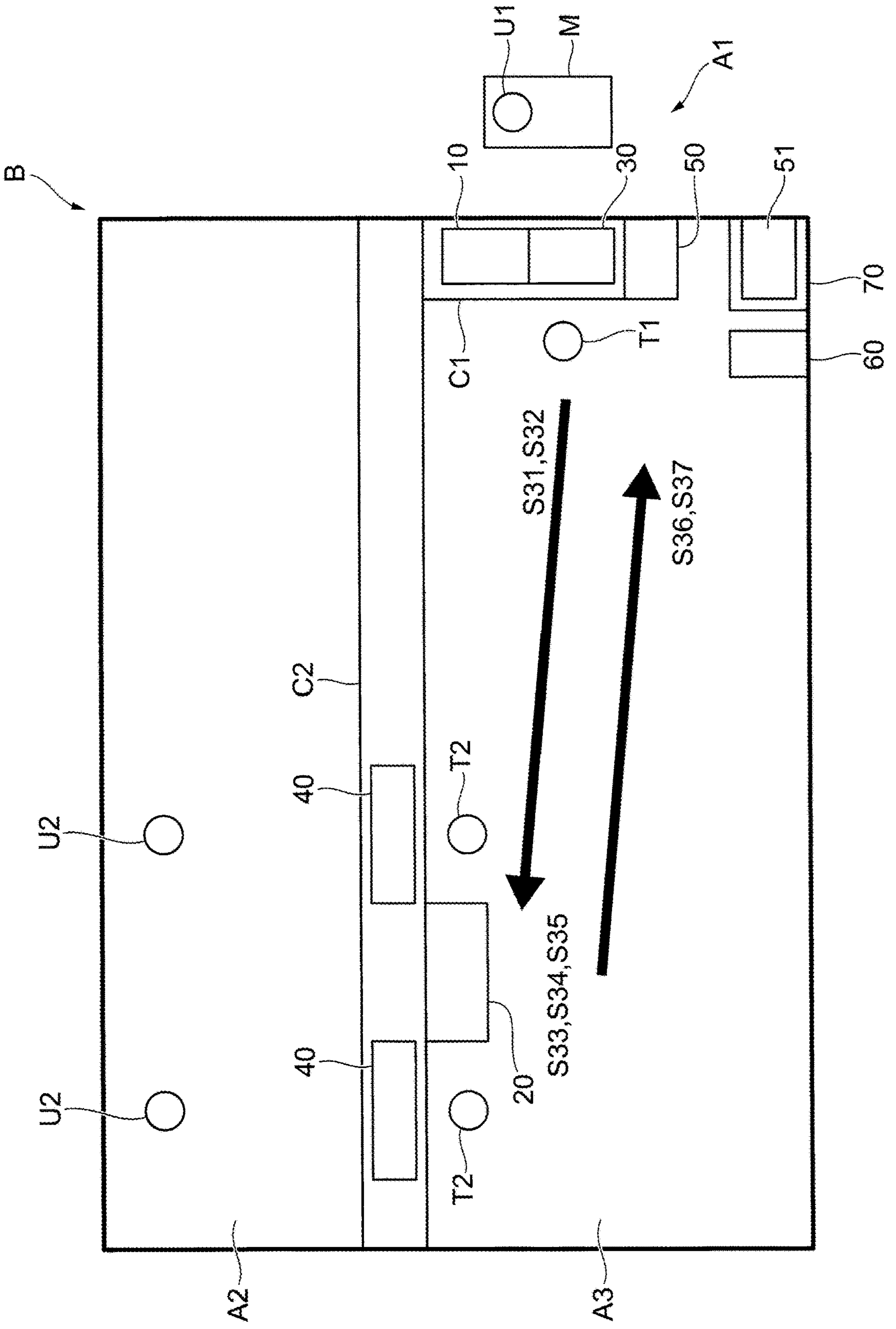
FIG. 9 shows an example of the layout of a bank according to a third exemplary embodiment.

FIG. 9 shows an example layout of a bank B according to a third exemplary embodiment. The layout of the bank B according to the third exemplary embodiment is the same as the layout of the bank B according to the first exemplary embodiment shown in FIG. 1.

In the third exemplary embodiment, tellers T1 and T2 may generally perform the following actions.

First, the teller T1 may receive banknotes for deposit from the customer U1 at the drive-through counter C1 (step 31). At that time, the teller T1 may acquire the account information about the customer U1 using the card reader and the like of the banknote counting device 10. The teller T1 may also count the banknotes received from the customer U1 with the banknote counting device 10. The drive-through terminal 30 may then obtain the account information and counting results from the banknote counting device 10. The counting results may include the denominations and the symbolic code numbers of the banknotes.

Next, the teller T1 may store the received banknotes in the external cassette 50 (step 32). Here, the internal chip of the external cassette 50 may hold the unique number of the external cassette 50. The unique number of the external cassette 50 may be, for example, the terminal number of the terminal 30. The unique number may be used to identify the appropriate external cassette 50 from among multiple external cassettes that may be attached to the banknote processing device 20.

The teller T1 may then move to the teller counter C2. That is, the teller T1 may move to the teller counter C2 even if the external cassette 50 in use is not full of received banknotes. The subsequent steps 33 to 37 are the same as steps 13 to 17 in FIG. 1.

In the third exemplary embodiment, the banknote processing device 20 is located at the teller counter C2 as in first exemplary embodiment. However, the banknote processing device 20 may be located in the bank lobby A2 as in second exemplary embodiment.

What is claimed is:

1. A system for processing media, comprising:
- a first media processing device without a safe and configured to count media;
- a second media processing device having a safe including an internal storage, the second media processing device being configured to take in media from an external storage attached outside the safe and store the media in the internal storage; and
- a computer coupled to the first media processing device and the second media processing device, wherein
- the computer is configured to, in response to a total number of media counted by the first media processing device exceeding an upper limit value of the external storage, output warning information to prompt an operator to attach the external storage to the second media processing device.

2. The system of claim 1, wherein
- the first media processing device comprises:
  - a first inlet for media;
  - a first recognition sensor configured to count and discriminate media;
  - a first outlet for media; and
  - a first conveyor configured to transport media from the first inlet to the first outlet via the first recognition sensor, and
- the second media processing device comprises:
  - a second inlet for media;
  - a second recognition sensor configured to count and discriminate media; and
  - a second conveyor configured to transport media from the second inlet to the internal storage via the second recognition sensor.

3. The system of claim 1, further comprising a display or a speaker, wherein
- the computer is configured to control the display or the speaker to output the warning information.

4. The system of claim 1, wherein
- the first media processing device comprises a first recognition sensor configured to acquire serial numbers of media,
- the second media processing device comprises a second recognition sensor configured to acquire serial numbers of media, and the computer is configured to compare the serial numbers acquired by the first recognition sensor with the serial numbers acquired by the second recognition sensor.

5. The system of claim 1, wherein the computer comprises a memory configured to rewritably store the upper limit value.

6. The system of claim 1, wherein the computer is configured to reserve a storage process so that the second media processing device performs the storage process after another process being performed by the second media processing device is completed, the storage process being a process to take in media from the external storage attached outside the safe and store the media in the internal storage.

7. The system of claim 1, wherein the computer is configured to control the second media processing device to temporarily suspend another process being performed by the second media processing device and perform a storage process, the storage process being a process to take in media from the external storage attached outside the safe and store the media in the internal storage.

8. The system of claim 7, wherein the computer is configured to control the second media processing device to unlock the second media processing device to allow the external storage to be attached outside the safe, before the second media processing device performs the storage process.

9. The system of claim 1, wherein each of the first media processing device and the second media processing device is configured to process, as media, checks and banknotes in a mixed state.

10. The system of claim 1, wherein the second media processing device is a device used by at least one of a teller and a customer to process media.

11. The system of claim 1, wherein the second media processing device is configured to allow for selective attachment thereto of the external storage, the external storage is among a plurality of external storages, and the second media processing device is configured to discriminate the plurality of external storages.

12. The system of claim 1, further comprising a camera configured to capture an image of the operator, wherein the computer is configured to analyze the image captured by the camera and issue a warning in response to detecting an abnormality in the image.

13. The system of claim 1, further comprising a rack coupled to the computer and configured to store a spare external storage in a locked state, wherein the computer is configured to, in response to the total number of media counted by the first media processing device exceeding the upper limit value, control the rack to unlock the spare external storage.

14. The system of claim 1, wherein the computer is configured to prompt the operator to store a separator in the external storage together with media.

15. The system of claim 14, wherein the separator includes customer account information.

16. The system of claim 1, wherein the first media processing device is installed at a drive-through counter, and the second media processing device is installed at a teller counter or in a bank lobby distant from the drive-through counter.

17. The system of claim 16, wherein the computer is configured to, in response to completion of counting of media, perform a process for notifying a customer using the drive-through counter of the completion of the counting.

18. The system of claim 16, wherein the computer is configured to, in response to completion of taking in all of the media stored in the external storage to the internal storage of the second media processing device, transmit a message indicating the completion of taking in all of the media to an email address of a customer who has used the drive-through counter.

* * * * *